US011487677B2

(12) United States Patent
Shin et al.

(10) Patent No.: US 11,487,677 B2
(45) Date of Patent: Nov. 1, 2022

(54) STORAGE DEVICE AND A STORAGE SYSTEM INCLUDING THE SAME

(71) Applicant: SAMSUNG ELECTRONICS CO., LTD., Suwon-si (KR)

(72) Inventors: Min Gon Shin, Uiwang-si (KR); Ji Soo Kim, Seongnam-si (KR); Seung-Jae Lee, Hwaseong-si (KR); Ye Jin Yoon, Hwaseong-si (KR); Hwa Soo Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 80 days.

(21) Appl. No.: 16/996,304

(22) Filed: Aug. 18, 2020

(65) Prior Publication Data

US 2021/0191883 A1    Jun. 24, 2021

(30) Foreign Application Priority Data

Dec. 18, 2019    (KR) .................. 10-2019-0169852

(51) Int. Cl.
*G06F 12/14*    (2006.01)
*G06F 13/16*    (2006.01)
(Continued)

(52) U.S. Cl.
CPC ...... *G06F 12/1483* (2013.01); *G06F 12/1466* (2013.01); *G06F 13/126* (2013.01);
(Continued)

(58) Field of Classification Search
CPC ............. G06F 12/1483; G06F 12/1466; G06F 13/126; G06F 13/1668; G06F 13/4221; G06F 21/31; G06F 21/79
(Continued)

(56) References Cited

U.S. PATENT DOCUMENTS 6,539,380 B1    3/2003   Moran
7,031,188 B2    4/2006   Lee et al.
(Continued)

FOREIGN PATENT DOCUMENTS

JP    2017-157022    9/2017

OTHER PUBLICATIONS

European Search Report issued in corresponding European Patent Application No. EP 20 215 277.3 dated May 11, 2021.

*Primary Examiner* — Christopher B Shin
(74) *Attorney, Agent, or Firm* — F. Chau & Associates, LLC

(57) ABSTRACT

A storage device including: a bridge board to receive a first command; an authenticator to receive user information; and a memory device to receive the first command from the bridge board, the memory device includes a memory controller which determines a status of the memory device, provides status information including the determined status of the memory device to the bridge board, determines the status of the memory device as an unlocked status or a locked status, the bridge board includes a transceiver which communicates with the host through an interface, a register which stores interface information, and a bridge board controller which generates a first response to the first command in a format corresponding to the interface using the interface information, and provides the first response to a host, the first response includes a status bit which inhibits or allows a write operation with respect to the memory device.

18 Claims, 13 Drawing Sheets

(51) Int. Cl.
  *G06F 21/31*  (2013.01)
  *G06F 13/42*  (2006.01)
  *G06F 21/79*  (2013.01)
  *G06F 13/12*  (2006.01)
(52) U.S. Cl.
  CPC ...... *G06F 13/1668* (2013.01); *G06F 13/4221* (2013.01); *G06F 21/31* (2013.01); *G06F 21/79* (2013.01)
(58) Field of Classification Search
  USPC .......................................................... 711/163
  See application file for complete search history.

(56) References Cited

U.S. PATENT DOCUMENTS

| | | | |
|---|---|---|---|
| 7,464,219 B2 | 12/2008 | Hinriches et al. | |
| 7,631,161 B2 | 12/2009 | Haustein et al. | |
| 7,707,460 B2 | 4/2010 | Hyde, II et al. | |
| 8,612,643 B2 | 12/2013 | Rangarajan et al. | |
| 8,982,620 B2 | 3/2015 | Lee et al. | |
| 9,240,889 B2 | 1/2016 | Hsein | |
| 2002/0073340 A1* | 6/2002 | Mambakkam | G06F 21/32 726/2 |
| 2005/0005131 A1* | 1/2005 | Yoshida | G06F 21/31 713/183 |
| 2007/0177777 A1* | 8/2007 | Funahashi | G06F 21/32 382/124 |
| 2008/0162848 A1* | 7/2008 | Broyles | G06F 12/1433 711/163 |
| 2009/0249014 A1* | 10/2009 | Obereiner | G06F 12/1441 711/164 |
| 2015/0161404 A1 | 6/2015 | Mayes et al. | |
| 2016/0103625 A1* | 4/2016 | Fujimoto | G06F 13/16 711/103 |
| 2016/0364600 A1* | 12/2016 | Shah | G06K 9/00087 |
| 2017/0091123 A1* | 3/2017 | Sato | G06F 12/1441 |
| 2018/0165134 A1* | 6/2018 | Liu | G06F 13/26 |
| 2019/0034620 A1* | 1/2019 | Khatri | H04L 63/083 |
| 2019/0065113 A1* | 2/2019 | Kim | G11C 16/22 |
| 2019/0080067 A1 | 3/2019 | Wu et al. | |
| 2020/0120080 A1* | 4/2020 | Isozaki | H04L 63/062 |

* cited by examiner

DISK 1
DEFAULT
931.84 GB
READ ONLY

T7_SETUP (E:)
44 MB FAT
NORMAL
(MAIN PARTITION)

931.80 GB
NOT ALLOCATED

FIG. 6

| ⊜ DISK 1 | |
|---|---|
| DEFAULT<br>931.84 GB<br>ONLINE | NEW VOLUME<br>931.84 GB exFAT<br>NORMAL<br>(MAIN PARTITION) |

| Bit<br>Byte | 7 | 6 | 5 | 4 | 3 | 2 | 1 | 0 |
|---|---|---|---|---|---|---|---|---|
| 0 | PS | SPF (0b) | PAGE CODE (0Ah) | | | | | |
| 1 | PAGE LENGTH (0Ah) | | | | | | | |
| 2 | TST = 000b | | | 0b | 0b | 0b | 0b | 0b |
| 3 | 0001b | | | | 0b | 00b | | 0b |
| 4 | 0b | 0b | 00b | | SWP | 000b | | |
| 5 | 0b | 0b | 000b | | | 000b | | |
| 6 | 0000h | | | | | | | |
| 7 | | | | | | | | |
| 8 | BUSY TIMEOUT PERIOD | | | | | | | |
| 9 | | | | | | | | |
| 10 | 0000h | | | | | | | |
| 11 | | | | | | | | |

265

STORAGE DEVICE AND A STORAGE SYSTEM INCLUDING THE SAME

CROSS-REFERENCE TO RELATED APPLICATION

This application claims priority under 35 U.S.C. § 119 to Korean Patent Application No. 10-2019-0169852 filed on Dec. 18, 2019 in the Korean Intellectual Property Office, the disclosure of which is incorporated by reference herein in its entirety.

TECHNICAL FIELD

The present inventive concept relates to a storage device and a storage system including the same.

DESCRIPTION OF THE RELATED ART

A flash memory is a nonvolatile memory that can retain stored data even when its power supply is interrupted. Flash memory can be electrically erased and reprogrammed. Storage devices including a flash memory such as an embedded multimedia card (eMMC), a universal flash storage (UFS), a solid state drive (SSD) and a memory card are widely used. Such storage devices may store or move large amounts of data.

A storage system may include a host and a storage device that can exchange data with each other through various interfaces. The storage device may provide a security mode. For example, the security mode of the storage device may enable the storage device to be unlocked through user authentication or the like.

However, when the storage device is locked, the storage device should be able to provide a user with a guide file for using a security function of the storage device. This guide file should not be modified or deleted by the user.

SUMMARY

According to an exemplary embodiment of the present inventive concept, there is provided a storage device including: a bridge board configured to receive a first identification command from a host; an authenticator configured to receive user information from a user; and a memory device configured to receive the first identification command from the bridge board, wherein the memory device includes a memory controller which determines a status of the memory device in response to the first identification command, provides status information including the determined status of the memory device to the bridge board, determines the status of the memory device as an unlocked status when preset information coincides with the user information, and determines the status of the memory device as a locked status when the preset information does not coincide with the user information, wherein the bridge board includes a transceiver which communicates with the host through an interface, a register which stores interface information used for generating a response to the first identification command in a format corresponding to the interface, and a bridge board controller which generates a first response to the first identification command in the format corresponding to the interface using the interface information, and provides the first response to the host, wherein the first response includes a status bit which inhibits or allows a write operation with respect to the memory device, wherein the bridge board controller generates the first response by changing the status bit according to the determined status of the memory device, and wherein when it is determined that the memory device has the unlocked status, the memory controller provides the status information including the unlocked status to the bridge board in response to a second identification command different from the first identification command.

According to an exemplary embodiment of the present inventive concept, there is provided a storage device including: a memory device including a memory including a public area and a security area; a register configured to store a status bit indicating status information of the memory device, the status information including an unlocked status in which the public area and the security area are accessible by a host, and a locked status in which only the public area of the public and security areas is accessible by the host; and a bridge board configured to, in response to an identification command provided from the host, generate a response including the status bit stored in the register, wherein the status bit inhibits or allows a write operation at the memory device.

According to an exemplary embodiment of the present inventive concept, there is provided a storage system including: a host; and a storage device having an unlocked status in which a public area and a security area are accessible by the host, and a locked status in which only the public area of the public and security areas is accessible by the host, wherein the storage device includes: a memory controller configured to determine the locked status or the unlocked status of the storage device; a bridge board configured to provide an identification command received from the host to the memory controller, or receive status information of the storage device from the memory controller to provide a response to the host; and an authenticator to which user information of a user is inputted, wherein the memory controller determines a status of the memory device as the unlocked status when preset information coincides with the user information, and determines the status of the memory device as the locked status when the preset information does not coincide with the user information.

BRIEF DESCRIPTION OF THE DRAWINGS

The above and other features of the present inventive concept will become more apparent by describing in detail exemplary embodiments thereof with reference to the attached drawings, in which:

FIG. 5 is a diagram explaining a memory in a storage device in a locked status, in accordance with an exemplary embodiment of the present inventive concept;

FIG. 6 is a diagram explaining a memory in a storage device in an unlocked status, in accordance with an exemplary embodiment of the present inventive concept;

FIG. 8 is a diagram explaining a control mode page of FIG. 7, in accordance with an exemplary embodiment of the present inventive concept;

DETAILED DESCRIPTION OF THE EMBODIMENTS

Figure 1:
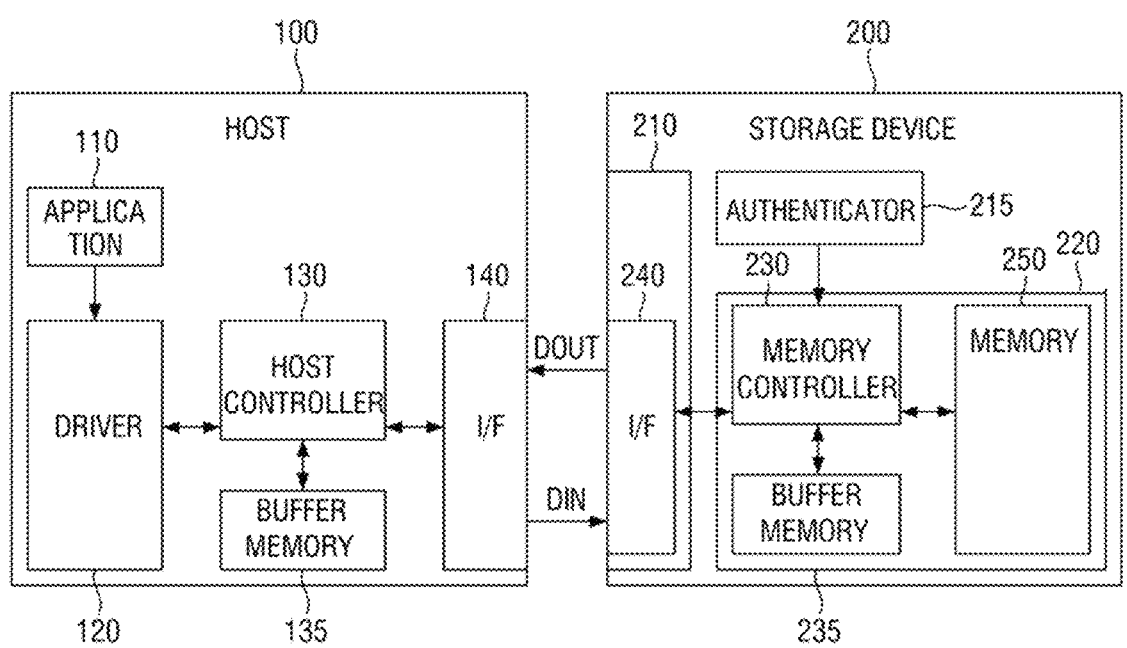
FIG. 1 is a schematic diagram illustrating a storage system according to exemplary embodiments of the present inventive concept.

FIG. 1 is a schematic diagram illustrating a storage system according to exemplary embodiments of the present inventive concept.

Referring to FIG. 1, a storage system according to exemplary embodiments of the present inventive concept may include a host 100 and a storage device 200.

The host 100 and the storage device 200 according to exemplary embodiments of the present inventive concept may communicate through a predetermined interface. The interface may be, for example, a small computer system interface (SCSI). However, the present inventive concept is not limited thereto, and the host 100 and the storage device 200 may communicate through an interface such as Universal Flash Storage (UFS), Serial Attached SCSI (SAS), Serial Advanced Technology Attachment (SATA), Peripheral Component Interconnect Express (PCIe), embedded Multi-MediaCard (eMMC), Fibre Channel (FC), Advanced Technology Attachment (ATA), Integrated Drive Electronics (IDE), Universal Serial Bus (USB) and IEEE 1394 (Firewire). Further, the predetermined interface may be any interface that allows data to be exchanged between the host 100 and the storage device 200.

The host 100 includes an application 110, a driver 120, a host controller 130, a buffer memory 135, and a host interface (I/F) 140.

The application 110 may be executed in the host 100 to control a semiconductor system based on a command set that may be used in the semiconductor system. In exemplary embodiments of the present inventive concept, the application 110 may support an SCSI command set, but the present inventive concept is not limited thereto.

The driver 120 may drive the storage device 200 connected to the host 100. For example, the driver 120 may receive a command for controlling the storage device 200 from the application 110, process the command using the host controller 130, and then provide the processing result to the application 110.

The application 110 and the driver 120 may be implemented in software or firmware, but the present inventive concept is not limited thereto.

The host controller 130 controls the overall operation of the host 100. For example, the host controller 130 may transmit data stored in the buffer memory 135 to the storage device 200 through the host interface 140 in response to a write command received from the driver 120. Further, the host controller 130 may receive data from the storage device 200 through the host interface 140 in response to a read command received from the driver 120.

The buffer memory 135 may be used as a main memory of the host 100 or may be used as a cache memory or a temporary memory for temporarily storing data. In addition, the buffer memory 135 may be used as a driving memory for driving software such as the application 110 or the driver 120. The buffer memory 135 may include, for example, a volatile memory including a dynamic random access memory (DRAM), but the present inventive concept is not limited thereto.

The host interface 140 may exchange data with a storage device interface (I/F) 240 of the storage device 200 through data lines DIN and DOUT.

The storage device 200 may include a bridge board 210 including the storage device interface 240, an authenticator 215, and a memory device 220 including a memory controller 230 and a memory 250. The memory device 220 may also include a buffer memory 235.

The storage device 200 may be connected to the host 100 through the storage device interface 240.

The bridge board 210 may be disposed in the storage device 200. The bridge board 210 may be disposed separately from the memory device 220. The bridge board 210 may provide a command sent from the host 100 to the memory device 220, and send a response to the command to the host 100.

The authenticator 215 may receive user information inputted from a user. The authenticator 215 may include, for example, a fingerprint recognition sensor that recognizes the user's fingerprint, a camera or a keypad that recognizes the user's iris or face, and the like. The user information may include, for example, a fingerprint, iris, face or key value. The user information inputted to the authenticator 215 may be provided to the memory controller 230.

The memory controller 230 may perform operations of writing, reading, or erasing data requested by the host 100 with respect to the memory 250. Further, the memory controller 230 may perform user authentication, and may determine the status of the memory device 220 based on the user authentication. The status of the memory device 220 may include a locked status and an unlocked status, which will be described below with reference to FIG. 2. The buffer memory 235 may be used to temporarily store data to be stored in the memory 250 or data read from the memory 250. The buffer memory 235 may include, for example, a volatile memory including a DRAM, but the present inventive concept is not limited thereto.

The memory 250 may include a flash memory, a magnetoresistive random access memory (MRAM), a phase-change random access memory (PRAM), a ferroelectric random access memory (FeRAM), or the like, but the present inventive concept is not limited thereto.

Figure 2:
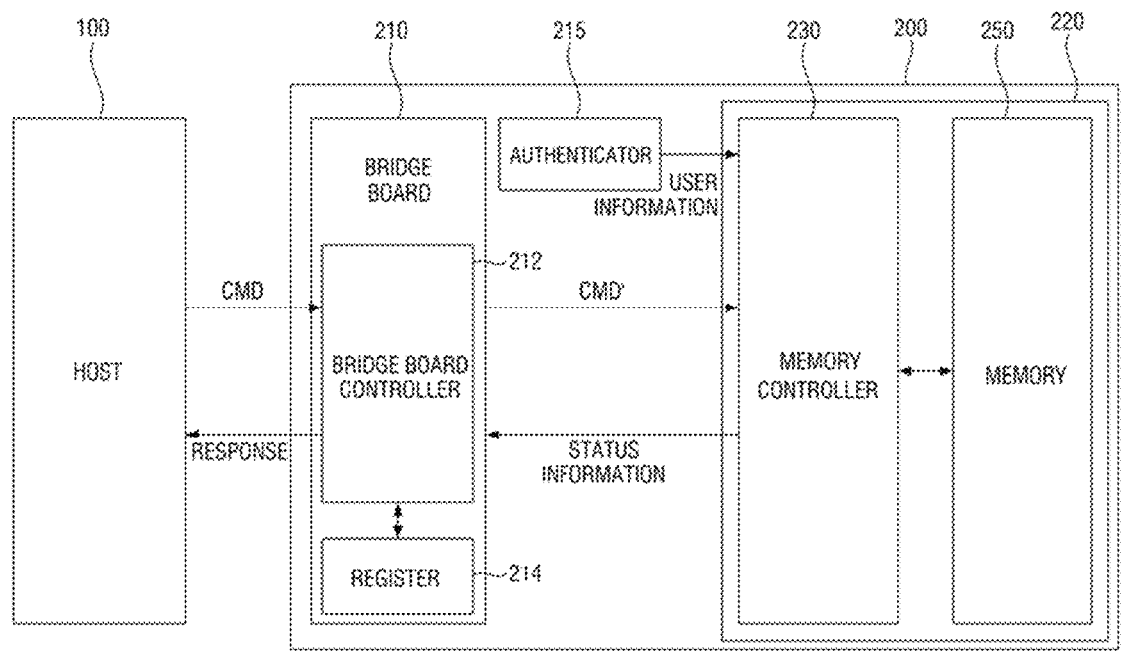
FIG. 2 is a block diagram illustrating a storage system in accordance with exemplary embodiments of the present inventive concept.

FIG. 2 is a block diagram illustrating a storage system in accordance with exemplary embodiments of the present inventive concept.

Referring to FIG. 2, a storage system according to exemplary embodiments of the present inventive concept may include the host 100 and the storage device 200.

The host 100 may provide a command CMD to the storage device 200. The command CMD may be, for example, an identification command for identifying the storage device 200 connected to the storage host 100. In the following description, it is assumed that the command is an identification command.

The storage device 200 may include the bridge board 210, the authenticator 215, and the memory device 220. The storage device 200 may generate a response to the command CMD provided from the host 100 and provide the response to the host 100.

The bridge board 210 may include a bridge board controller 212 and a register 214. The bridge board 210 may further include a transceiver which communicates with the host 100 through a predetermined interface. The transceiver may be the storage device interface 240 of FIG. 1.

The register 214 may store interface information about a format corresponding to a predetermined interface. The predetermined interface may be, for example, an SCSI, but the present inventive concept is not limited thereto.

The bridge board controller 212 may receive an identification command CMD from the host 100. The bridge board controller 212 may analyze the identification command CMD using the interface information stored in the register 214, and provide the analyzed identification command CMD' to the memory device 220.

The authenticator 215 may receive the user information inputted from the user. The authenticator 215 may include a fingerprint recognition sensor, a camera or a keypad. When the authenticator 215 is a fingerprint recognition sensor, the user information may be a fingerprint. When the authenticator 215 is a camera, the user information may be an iris or a face. When the authenticator 215 is a keypad, the user information may be a key value.

The memory device 220 may include the memory controller 230 and the memory 250. The memory controller 230 may receive the user information from the authenticator 215, and determine the status of the memory device 220. The status of the memory device 220 may include a locked status and an unlocked status.

The storage device 200 according to exemplary embodiments of the present inventive concept may provide a security mode, and determine the status of the memory device 220 in the security mode. The security mode may refer to, for example, a mode in which the storage device 200 enters into an unlocked status from a locked status through user authentication or the like. The locked status may mean a status in which the host 100 can access only a partial area of the memory 250, and the unlocked status may mean a status in which the host 100 may access the entire area of the memory 250.

The security mode may be released when the storage device 200 enters the unlocked status through user authentication. In other words, when the security mode is released, the storage device 200 may maintain the unlocked status. However, when the storage device 200 is powered off and then powered on, the storage device 200 may enter the security mode. In other words, in the event of power off, the storage device 200 is automatically put back in the security mode and thus locked. Thus, the powered-on storage device 200 may be in the locked status, and the storage device 200 may be changed to the unlocked status through user authentication.

User authentication may mean that the memory controller 230 determines whether preset information coincides with the user information inputted through the authenticator. In other words, the memory controller 230 performs a comparison to determine if the user information matches previously stored information indicative of the user's identification. The memory controller 230 may determine that the memory device 220 is in the unlocked status when the user information provided from the authenticator 215 coincides with the preset information. The memory controller 230 may determine that the memory device 220 is in the locked status when the user information provided from the authenticator 215 does not coincide with the preset information.

The memory controller 230 may determine that the memory device 220 is in the unlocked status, for example, when the user's fingerprint recognized by the authenticator 215 coincides with a preset user's fingerprint, when the key value inputted through the authenticator 215 coincides with a preset key value, or when the user's iris or face recognized by the authenticator 215 coincides with a preset user's iris or face.

The memory controller 230 may provide status information including the status of the memory device 220 to the bridge board 210. The memory controller 230 may provide status information to the bridge board 210 in response to the analyzed identification command CAD' provided from the bridge board 210. Alternatively, the memory controller 230 may provide status information to the bridge board 210 when the status of the memory device 220 is changed, for example, when the status of the memory device 220 is changed from the locked status to the unlocked status.

The bridge board controller 212 may generate a response corresponding to the identification command CMD using the interface information stored in the register 214. The response corresponding to the identification command CMD may include the status information of the memory device 220.

Figure 3:
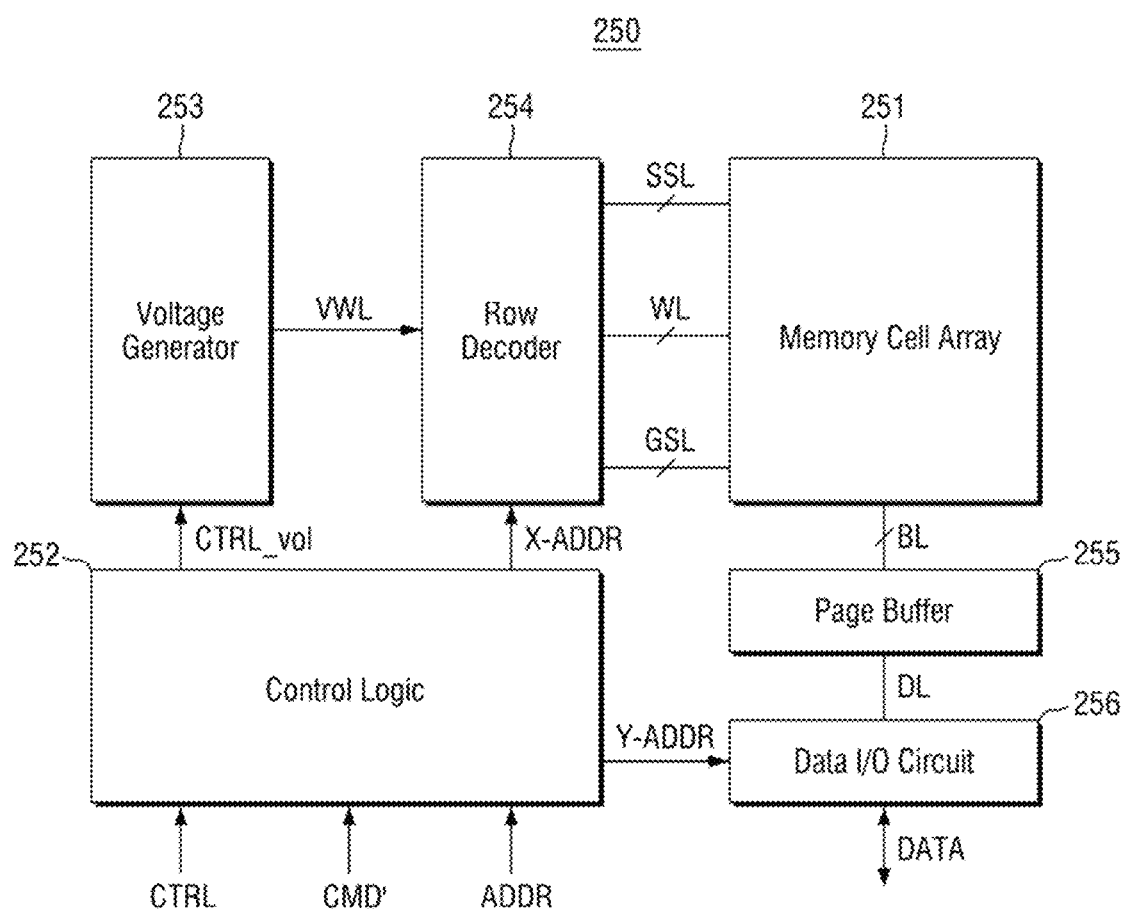
FIG. 3 is a block diagram illustrating a memory of FIG. 2, in accordance with an exemplary embodiment of the present inventive concept.

FIG. 3 is a block diagram illustrating the memory of FIG. 2, in accordance with an exemplary embodiment of the present inventive concept.

Referring to FIG. 3, the memory 250 may include a memory cell array 251 and control logic 252.

The memory cell array 251 may include a plurality of memory cells. The memory cell array 251 may be connected to a row decoder 254 through a string select line SSL, a plurality of word lines WL, and a ground select line GSL. Further, the memory cell array 251 may be connected to a page buffer circuit 255 through a plurality of bit lines BL.

The control logic 252 may control the memory 250 based on the analyzed command CMD', an address signal ADDR, and a control signal CTRL received from the memory controller 230. The control logic 252 may control, for example, a write operation, a read operation and an erase operation of the memory 250.

The control logic 252 may provide a voltage control signal CTRL_vol to a voltage generator 253. The control logic 252 may generate a row address X-ADDR and a column address Y-ADDR based on the address signal ADDR.

The voltage generator 253 may generate an operating voltage to operate the memory 250 in response to the voltage control signal CTRL_vol. The row decoder 254 may select the string select line SSL, at least one of the word lines WL, and the ground select line GSL in response to the row address X-ADDR.

The page buffer circuit 255 may temporarily store data to be written to a selected page during the write operation. The page buffer circuit 255 may temporarily store data read from the selected page during the read operation.

A data input/output circuit (Data I/O Circuit) 256 may be connected to the page buffer circuit 255 through a data line DL. For example, during the write operation, the data input/output circuit 256 may receive write data DATA from the memory controller 230, and may provide the write data DATA to the page buffer circuit 255 based on the column address Y-ADDR provided from the control logic 252. For example, during the read operation, the data input/output circuit 256 may provide the read data DATA stored in the page buffer circuit 255 to the memory controller 230 based on the column address Y-ADDR provided from the control logic 252.

Figure 4:
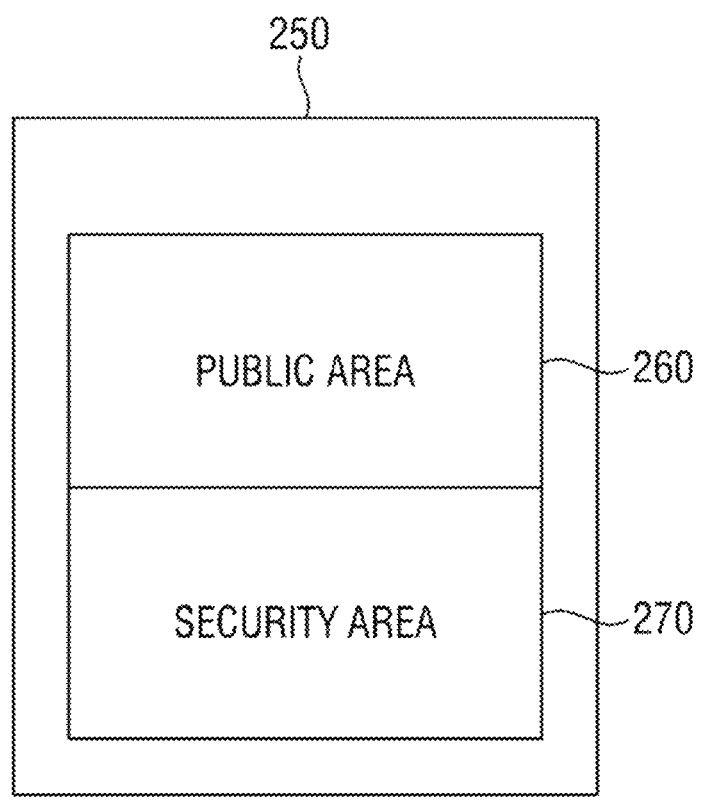
FIG. 4 is a block diagram illustrating the memory of FIG. 2, in accordance with an exemplary embodiment of the present inventive concept.

FIG. 4 is a block diagram illustrating the memory of FIG. 2, in accordance with an exemplary embodiment of the present inventive concept.

Referring to FIGS. 2 and 4, the memory 250 may include a public area 260 and a security area 270.

The public area 260 may be an area accessible by the host 100 when the storage device 200 is in the locked status and in the unlocked status in the security mode. In other words, the public area 260 may be accessed when the storage device 200 is locked or unlocked. The public area 260 may store, for example, a guide file of the storage device 200 and/or a boot data file of the storage device 200. This is because when the storage device 200 is in the locked status, the user should be able to read the guide file of the storage device 200 and/or the boot data file of the storage device 200. The data stored in the public area 260 of the memory 250 is not limited to the guide file and the boot data file, and may be any data which should be protected from a write or erase operation, or any data on which only a read operation can be performed.

The public area 260 may include, for example, a shadow master boot record. Therefore, the host 100 may load a preboot operating system (OS) through the shadow master boot record. In other words, the storage device 200 may be booted through the shadow master boot record. The storage device 200 according to exemplary embodiments of the present inventive concept may perform an authentication operation to change the status from the locked status to the unlocked status based on the shadow master boot record. When the storage device 200 is powered off and then powered on again, the storage device 200 enters the security mode. In other words, the storage device 200 is automatically put in the locked status. Therefore, the public area 260 may be an area that is recognized as a storage area by the host 100 when the storage device 200 is powered on.

The security area 270 may be an area accessible by the host 100 when the storage device 200 is in the unlocked status in the security mode. The security area 270 may include, for example, a master boot record (MBR). The master boot record may be an area that is recognized as the storage area by the host 100 in the unlocked status. Therefore, the security area 270 may be an area where a write, read or erase operation can be performed by the host 100.

FIG. 5 is a diagram explaining a memory in a storage device in a locked status, in accordance with an exemplary embodiment of the present inventive concept.

Referring to FIGS. 4 and 5, in the storage device 200 in the locked status, a portion of the memory 250 may be allocated as a main partition. The remaining portion of the memory 250 may not be allocated. Thus, the host 100 may recognize the main partition area of the memory 250 as the storage area.

The portion allocated as the main partition may be the public area 260, and the non-allocated portion may be the security area 270. The host 100 may access only the main partition area of the memory device 220. Hence, disk 1 default 931.84 GB "read only."

FIG. 6 is a diagram explaining a memory in a storage device in an unlocked status, in accordance with an exemplary embodiment of the present inventive concept.

Referring to FIGS. 4 and 6, the entire memory may be allocated as the main partition. Accordingly, the host 100 may recognize the entirety of the memory 250 as the storage area. Thus, the entirety of the public area 260 and the security area 270 may be allocated as the main partition, and the host 100 may access the entire area of the memory 250. Hence, disk 1 default 931.84 GB "online."

Figure 7:
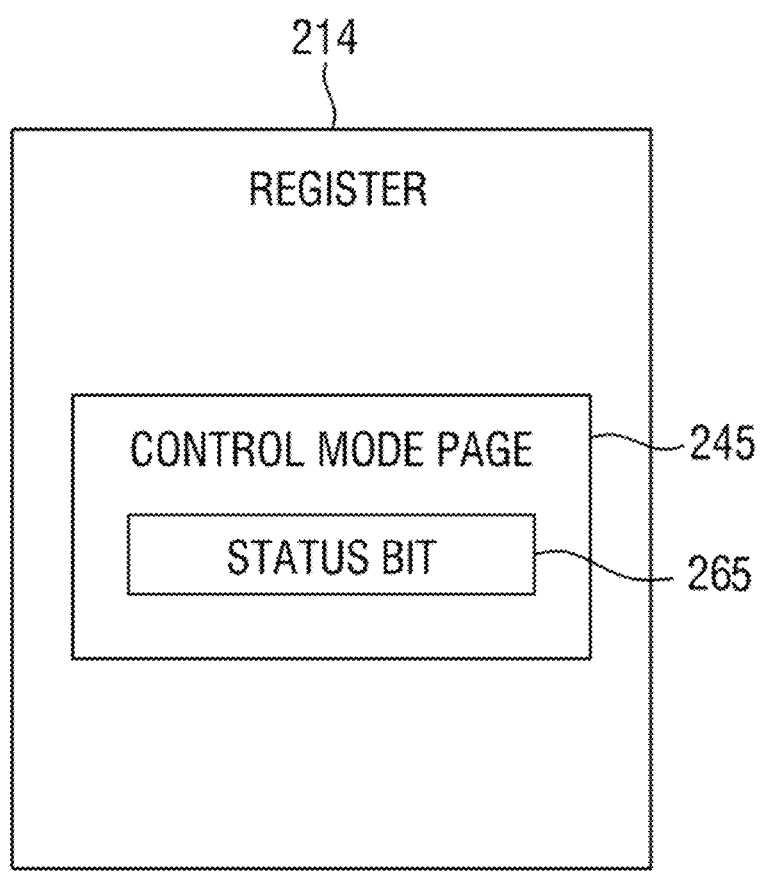
FIG. 7 is a block diagram illustrating interface information stored in a register of FIG. 2, in accordance with an exemplary embodiment of the present inventive concept.

FIG. 7 is a block diagram illustrating interface information stored in a register of FIG. 2, in accordance with an exemplary embodiment of the present inventive concept.

Referring to FIGS. 2 and 7, interface information may be stored in the register 214.

A format corresponding to an interface through which the host 100 and the storage device 200 communicate with each other may include a control mode page 245. The control mode page 245 may include control information that may be applied to the storage device 200 communicating with the host 100 through an interface. The control information included in the control mode page 245 may include, for example, a time during which the storage device 200 may return a busy signal for a command of the host 100 under an unexpected condition.

The control mode page 245 may include a status bit 265. The status bit 265 may inhibit or allow a write operation according to a write command with respect to the storage device 200. For example, if the status bit 265 is at a first logic level, the write operation according to the write command may be inhibited, and if the status bit 265 is at a second logic level, the write operation according to the write command may be allowed. Here, the first logic level may be 1 and the second logic level may be 0.

The storage device 200 communicating with the host 100 through an interface according to exemplary embodiments of the present inventive concept may indicate status information of the storage device 200 using the status bit 265. The status information may include, for example, an unlocked status and a locked status.

When the storage device 200 is in the locked status, since the write operation with respect to the storage device 200 should be inhibited, the bridge board controller 212 may change the status bit 265 to the first logic level. When the storage device 200 is in the unlocked status, since a user authentication operation has been performed, the write operation should be allowed with respect to the storage device 200. Accordingly, the bridge board controller 212 may change the status bit 265 to the second logic level. In other words, the bridge board controller 212 may change the status bit 265 to the second logic level when the user is successfully authenticated. Here, the first logic level may be 1 and the second logic level may be 0.

Therefore, the host 100 may determine whether the storage device 200 is a read-only device or a read/write device depending on the state of the status bit 265. The host 100 may recognize the storage device 200 as a read-only device if the status bit 265 is at the first logic level, and may recognize the storage device 200 as a read/write device if the status bit 265 is at the second logic level. This will be described below with reference to FIG. 8.

FIG. 8 is a diagram explaining a control mode page of FIG. 7, in accordance with an exemplary embodiment of the present inventive concept.

Referring to FIGS. 2, 7 and 8, an interface according to exemplary embodiments of the present inventive concept may be, for example, SCSI, and the identification command CMD provided from the host 100 may include an SCSI command. The status bit 265 included in the control mode page 245 according to exemplary embodiments of the present inventive concept may be a software write protect (SWP) bit included in the control mode page of the SCSI command. However, the present inventive concept is not limited thereto, and the status bit 265 may be any bit which can indicate the locked status or the unlocked status of the storage device 200 and is included in a format corresponding to a predetermined interface between the host 100 and the storage device 200.

If the status bit 265 is 1, the write operation may be inhibited with respect to the storage device 200. The write operation according to the write command may be inhibited with respect to the storage device 200. Thus, the host 100 may recognize the storage device 200 as a read-only device. In this case, the host 100 may stop issuing the write command or the like with respect to the storage device 200.

If the status bit 265 is 0, the write operation may be allowed with respect to the storage device 200. The write operation according to the write command may be allowed with respect to the storage device 200. Thus, the host 100 may recognize the storage device 200 as a read/write device. The host 100 may issue the write command or the like with respect to the storage device 200.

The identification command CMD provided from the host 100 may also include the status bit 265. The host 100 may change the status bit 265 in the identification command CMD. However, the storage device 200 according to exemplary embodiments of the present inventive concept may change the status bit 265 according to the status information of the storage device 200 regardless of the value of the status bit 265 in the identification command CMD. In other words, the status bit 265 in the identification command CMD may be ignored.

Figure 9:
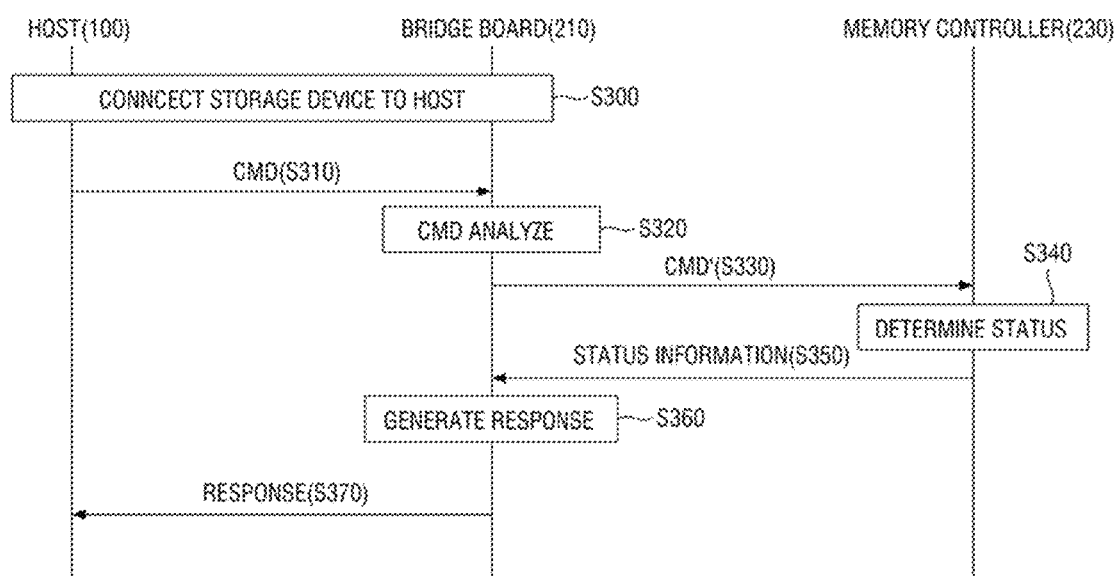
FIG. 9 is a flowchart illustrating a storage system according to exemplary embodiments of the present inventive concept.

FIG. 9 is a flowchart illustrating a storage system according to exemplary embodiments of the present inventive concept.

Referring to FIGS. 2 and 9, in a storage system according to exemplary embodiments of the present inventive concept, the host 100 and the storage device 200 may be connected (step S300).

The bridge board 210 included in the storage device 200 may receive the identification command CMD from the host 100 (step S310). The identification command CMD may be in a format corresponding to a predetermined interface with the host 100.

The bridge board 210 may analyze the identification command CMD using the interface information stored in the register 214 (step S320).

The bridge board 210 may provide the analyzed identification command CMD to the memory controller 230 (step S330).

The memory controller 230 may determine the status of the memory device 220 in response to the analyzed identification command CMD' (S340). The status of the memory device 220 may include an unlocked status and a locked status. The memory controller 230 may provide status information including the determined status of the memory device 220 to the bridge board 210 (S350).

The bridge board 210 may generate a response to the identification command CMD according to the predetermined interface using the interface information stored in the register 214 (step S360).

The bridge board 210 may provide a response to the identification command CMD to the host 100 (step S370).

Figure 10:
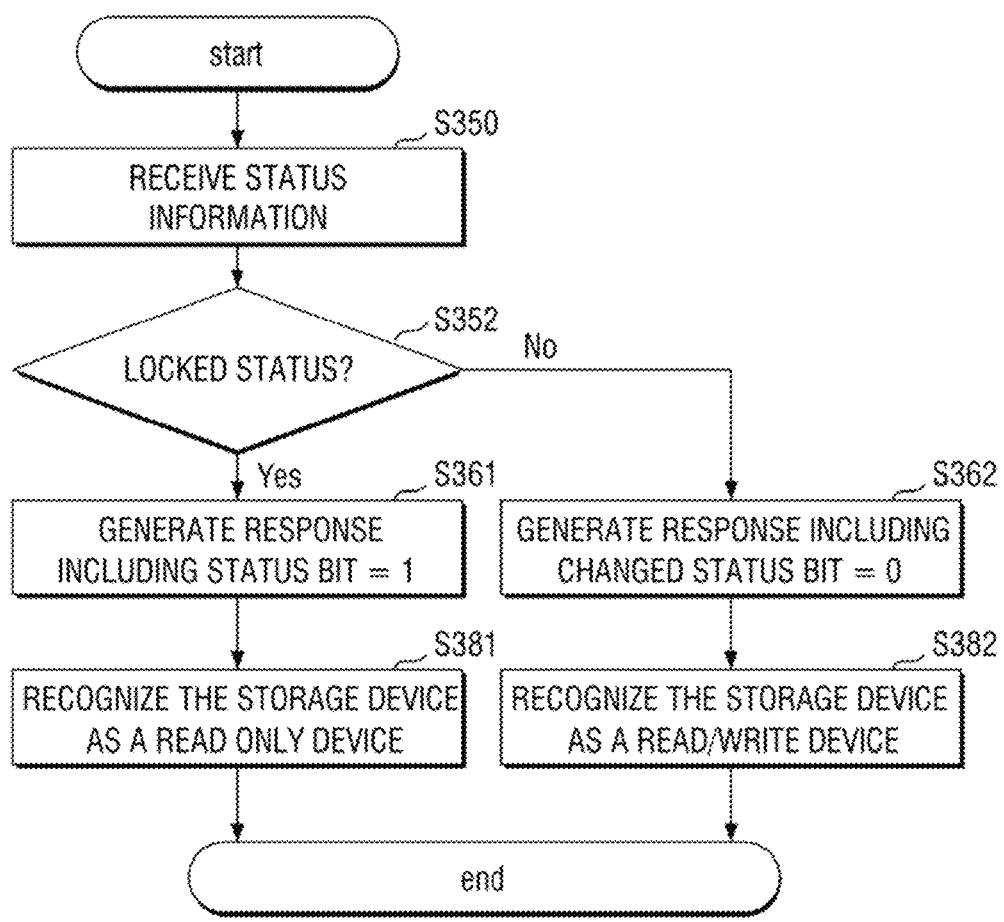
FIG. 10 is a flowchart of the step of generating, a response to an identification command in a format corresponding to an interface of FIG. 9, in accordance with an exemplary embodiment of the present inventive concept.

FIG. 10 is a flowchart of step S360 of generating a response to the identification command CMD in a format corresponding to an interface of FIG. 9, in accordance with an exemplary embodiment of the present inventive concept.

Referring to FIGS. 2, 9 and 10, the bridge board 210 may receive status information including the status of the memory device 220 from the memory controller 230 (step S350).

The bridge board controller 212 included in the bridge board 210 may determine whether the status information of the memory device 220 provided from the memory controller 230 includes the locked status (step S352).

If the status information of the memory device 220 includes the locked status, the bridge board controller 212 may change the status bit to the first logic level. The first logic level being indicative of the locked status. The first logic level may be, for example, 1.

Here, the format corresponding to the interface may include a control mode page including control information for controlling the storage device 200 communicating through the interface. The control mode page may include a status bit indicating status information of the memory device 220.

The bridge board controller 212 may generate a response including a status bit of the first logic level (step S361).

The host 100 having received the response including the status bit of the first logic level may recognize the storage device 200 as a read-only device (step S381).

If the status information of the memory device 220 includes the unlocked status (No, S352), the bridge board controller 212 may change the status bit to the second logic level. The second logic level being indicative of the unlocked status. The second logic level may be, for example, 0.

The bridge board controller 212 may generate a response including a status bit of the second logic level (step S362). The bridge board controller 212 may provide a response including a status bit of the second logic level to the host 100. The host 100 having received the response including the status bit of the second logic level may recognize the storage device 200 as a read/write device (step S382).

Figure 11:
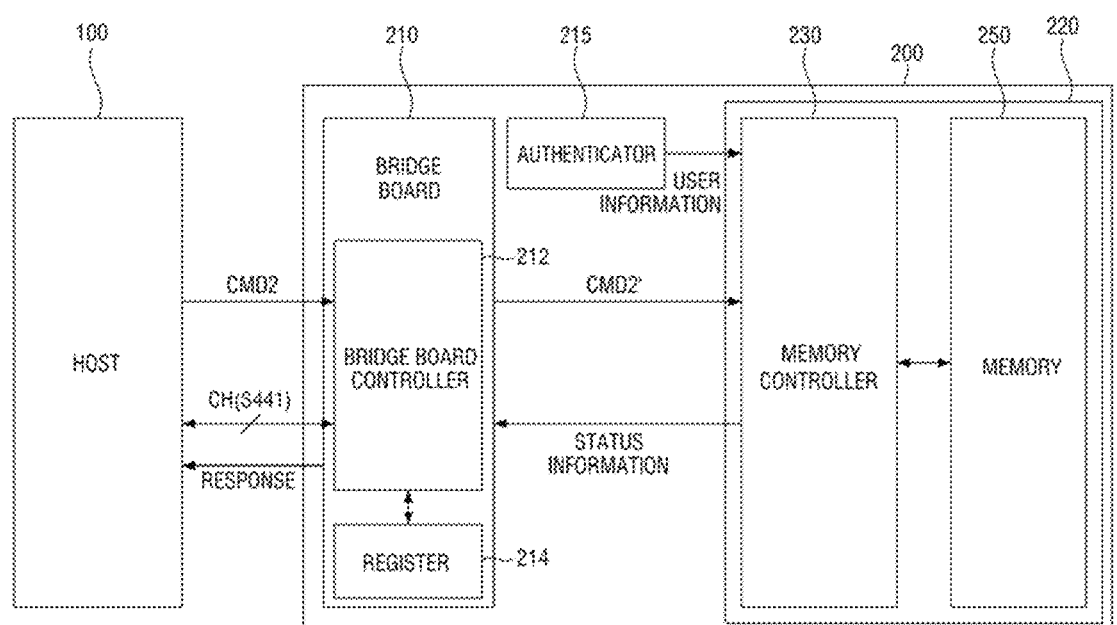
FIG. 11 is a block diagram illustrating a storage device according to other exemplary embodiments of the present inventive concept.
Figure 12:
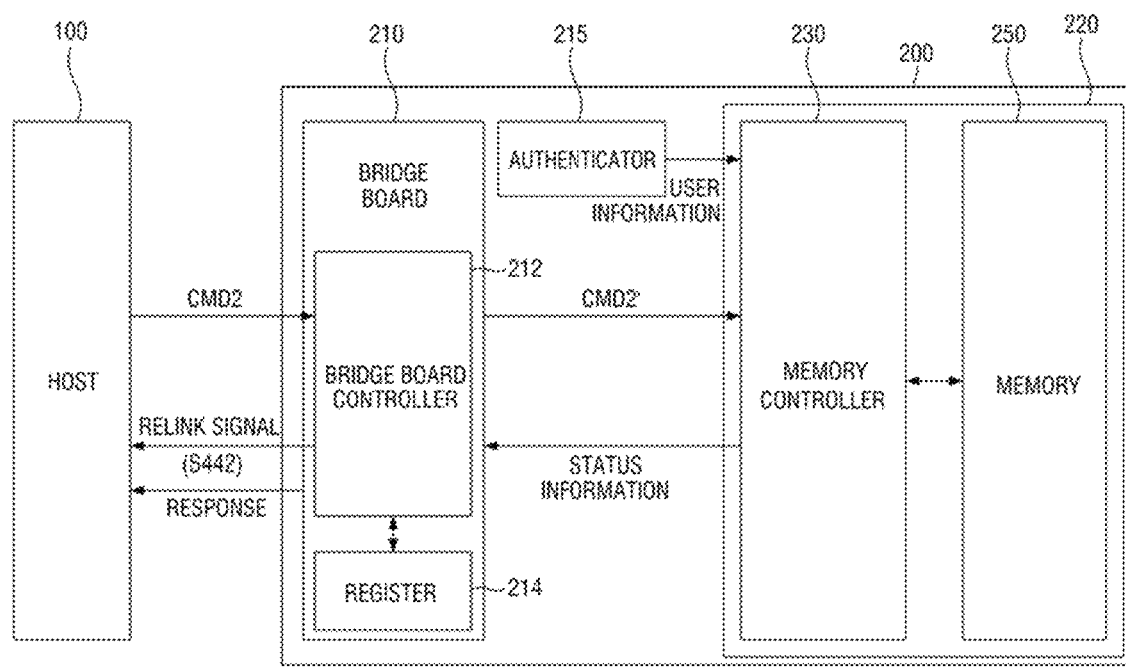
FIG. 12 is a diagram illustrating a storage device according to other exemplary embodiments of the present inventive concept.
Figure 13:
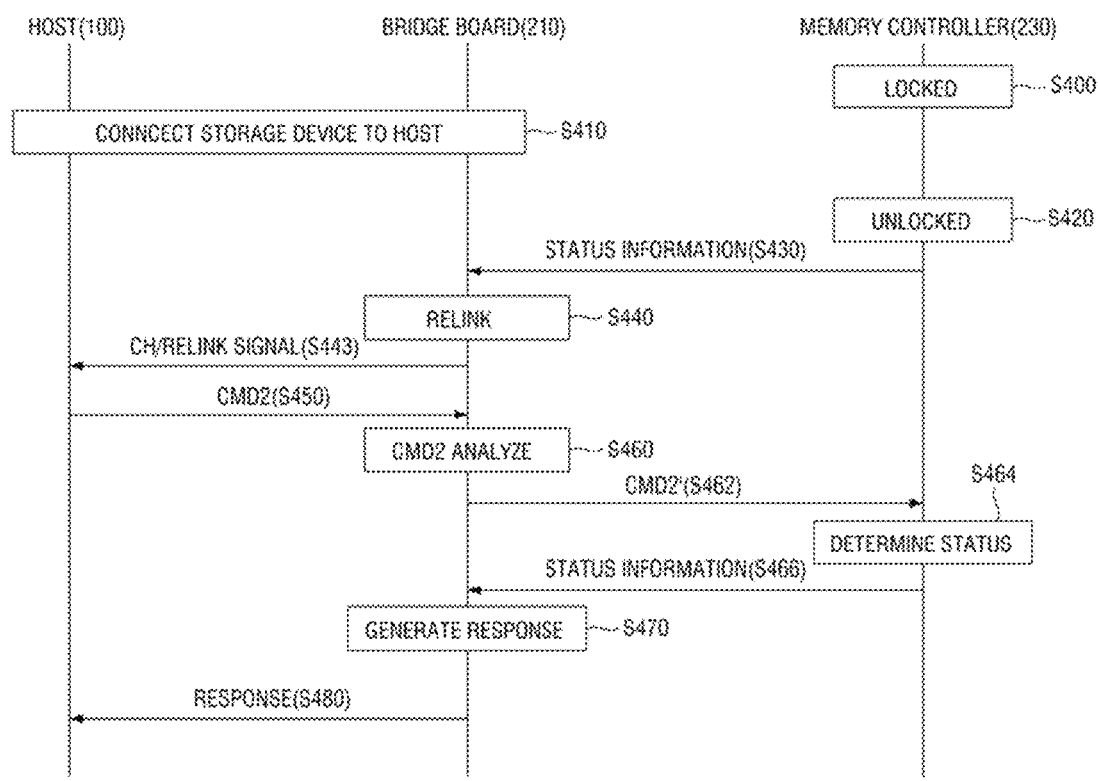
FIG. 13 is a flowchart illustrating a storage device according to other exemplary embodiments of the present inventive concept.

FIG. 11 is a block diagram illustrating a storage device according to other exemplary embodiments of the present inventive concept. FIG. 12 is a diagram illustrating a storage device according to other exemplary embodiments of the present inventive concept. FIG. 13 is a flowchart illustrating a storage device according to other exemplary embodiments of the present inventive concept. For simplicity of description, the following description will focus on differences from the above description.

Referring to FIGS. 11 to 13, a storage device 200 according to other exemplary embodiments of the present inventive concept may be in the security mode. The storage device 200 may be in the locked status (step S400) and may be connected to the host 100 (step S410).

The storage device 200 may enter the unlocked status from the locked status through user authentication or the like (step S420). For example, when the preset information coincides with the user information input during die authentication process, the status of the storage device 200 is changed to the unlocked status, and thus, the security mode may be released. The memory controller 230 may transfer status information of the storage device including the unlocked status to the bridge board 210 (step S430).

The bridge board 210 may perform a relink operation in response thereto (step S440). For example, the memory device 220 may provide a relink signal (RELINK) to the host 100 (S443). In other words, the bridge board 210 may be reconnected to the memory device 220. Accordingly, the host 100 may recognize that the storage device 200 is connected. Thus, the host 100 may provide an identification command (CMD2) to the storage device 200 (step S450).

Referring to FIG. 11, the relink operation may include, for example, an operation of reconnecting a data channel (CH, S443) between the host 100 and the bridge board 210.

Referring to FIG. 12, the relink operation may include, for example, an operation in which the bridge board 210 provides a relink signal (S442) to the host 100. The relink signal may include a signal indicating that the storage device 200 is connected to the host 100.

However, the present inventive concept is not limited thereto, and the Mink operation may include an operation of notifying that the storage device 200 is connected to the host 100.

The host 100 may provide a second identification command CMD2 in response to the notification received from the bridge board 210 (step S450).

Similar to that described above with reference to FIG. 9, the bridge board 210 may analyze the second identification command CMD2 (step S460). The bridge board 210 may provide the analyzed identification command CMD2' to the memory controller 230 (step S462). The memory controller 230 may determine the status of the memory device 220 (step S464) and provide status information to the bridge board 210 (step S466). Here, the status information may include an unlocked status.

The bridge board 210 may generate a response to the second identification command CMD2 according to the interface using the interface information stored in the register 214 (step S470) and provide the response to the host 100 (step S480). The bridge board 210 may change the status bit included in the format corresponding to the interface to the second logic level. The response to, the second identification command CMD2 (S480) may include a status bit of the second logic level.

Thus, the host 100 may recognize the storage device 200 as a read/write device. Then, if an identification command is provided by the host 100, the storage device 200 may provide a response including the status bit of the second logic level. In other words, the storage device 200 may be maintained in the unlocked status. When the storage device 200 is powered off and then powered on again, the storage device 200 may enter the security mode and may be in the locked status. Accordingly, the powered-on storage device 200 having received the identification command from the host 100 may provide a response including a status bit of the first logic level. The powered-on storage device 200 may enter the unlocked status through user authentication or the like such as whether the preset information coincides with the user information, as described above.

Exemplary embodiments of the present inventive concept provide a storage device having a security mode, capable of determining an unlocked/locked status of the storage device and providing a response in a format corresponding to an interface through which the storage device communicates with a host.

Exemplary embodiments of the present inventive concept also provide a storage system including a storage device having a security mode and a host, wherein the storage device determines an unlocked/locked status of the storage device and provides a response in a format corresponding to an interface through which the storage device communicates with a host, and the host recognizes the storage device as a read-only device or read/write device based on the response.

While the present inventive concept has been described with reference to exemplary embodiments thereof, it will be understood by those of ordinary skill in the art that various changes in form and details may be made thereto without departing from the spirit and scope of the present inventive concept as set forth by the following claims.

What is claimed is:

1. A storage device, comprising:
a bridge board configured to receive a first identification command from a host;
an authenticator configured to receive user information from a user; and
a memory device configured to receive the first identification command from the bridge board,
wherein the memory device includes a memory controller which determines a status of the memory device in response to the first identification command, provides status information including the determined status of the memory device to the bridge board, determines the status of the memory device as an unlocked status when preset information coincides with the user information, and determines the status of the memory device as a locked status when the preset information does not coincide with the user information,
wherein the bridge board includes a transceiver which communicates with the host through an interface, a register which stores interface information used for generating a response to the first identification command in a format corresponding to the interface, and a bridge board controller which generates a first response to the first identification command in the format corresponding to the interface using the interface information, and provides the first response to the host,
wherein the first response includes a status bit which inhibits or allows a write operation with respect to the memory device,
wherein the bridge board controller generates the first response by changing the status bit, which is a software write protect bit included in a control mode page of a small computer system interface (SCSI) command, according to the determined status of the memory device, and
wherein when it is determined that the memory device has the unlocked status, the memory controller provides the status information including the unlocked status to the bridge board in response to a second identification command different from the first identification command.

2. The storage device of claim 1, wherein the format corresponding to the interface includes the control mode pave containing control information for controlling the storage device communicating with the host through the interface.

3. The storage device of claim 2, wherein the bridge board controller changes the status bit to a first logic level to generate the first response if the status information includes the locked status,
wherein the bridge board controller changes the status bit to a second logic level to generate the first response if the status information includes the unlocked status,
wherein the status bit of the first logic level inhibits the write operation, and
wherein the status bit of the second logic level allows the write operation to be performed.

4. The storage device of claim 1, wherein the bridge board is disposed separately from the memory device in the storage device.

5. The storage device of claim 1, wherein the memory controller determines whether the preset information coincides with the user information when the user information is inputted from the authenticator, wherein the memory controller provides the status information including the unlocked status to the bridge board when the preset information coincides with the user information, and wherein the bridge board changes the status bit and is reconnected to the host.

6. The storage device of claim 5, wherein the bridge board receives a third identification command different from the first identification command when the bridge board is reconnected to the host.

7. The storage device of claim 6, wherein the bridge board generates a second response to the third identification command, and the second response includes the changed status bit.

8. The storage device of claim 1, wherein the memory device includes a public area accessible by the host in the locked status and the unlocked status, and a security area accessible by the host in the unlocked status and not accessible by the host in Ili locked status.

9. The storage device of claim 8, wherein the public area includes guide data of the storage device or boot data of the storage device.

10. A storage device, comprising:

a memory device including a memory including a public area and a security area;

a register configured to store a status bit indicating status information of the memory device, the status information including an unlocked status in which the public area and the security area are accessible by a host, and a locked status in which only the public area of the public and security areas is accessible by the host; and a bridge board configured to, in response to an identification command provided from the host, generate a response including the status bit stored in the register, wherein the status bit inhibits or allows a write operation at the memory device, wherein the bridge board communicates with the host through an interface, and generates a response to the identification command in a format of the interface, and wherein the format of the interface is a small computer system interface (SCSI), and the status bit is a software write protect (SWP) bit included in a control mode pane of the SCSI.

11. The storage device of claim 10, wherein the memory device further includes a memory controller which determines a status of the memory device and provides the status information including the status of the memory device to the bridge board when the status of the memory device is changed.

12. The storage device of claim 11, wherein the bridge board is reconnected to the host if the status information includes the unlocked status.

13. The storage device of claim 12, wherein the bridge board receives an identification command due to its reconnection with the host and changes the status bit to generate a response to the identification command.

14. The storage device of claim 10, wherein the public area includes guide data of the storage device or boot data of the storage device.

15. A storage system, comprising:

a host; and a storage device having an unlocked status in which a public area and a security area are accessible by the host, and a locked status in which only the public area of the public and security areas is accessible by the host, wherein the storage device includes:

a memory controller configured to determine the locked status or the unlocked status of the storage device;

a bridge board configured to provide an identification command received from the host to the memory controller, or receive status information of the storage device from the memory controller to provide a response to the host; and an authenticator to which user information of a user is inputted, wherein the memory controller determines a status of the memory device as the unlocked status when preset information coincides with the user information, and determines the status of the memory device as the locked status when the preset information does not coincide with the user information, wherein the bridge board includes:

a transceiver which communicates with the host through an interface, a register which stores interface information, and a bridge board controller which generates a response to the identification command in a format corresponding to the interface using the interface information, and provides the response to the host, and wherein the format corresponding to the interface includes a control mode page containing control information for controlling the storage device when it communicates with the host through the interface, wherein the control mode page includes a status bit which terminates a write command for the memory device provided from the host, or allows a write operation according to the write command to be performed, and wherein the bridge board controller generates the response by changing the status bit according to the status information of the memory device.

16. The storage system of claim 15, wherein the authenticator further includes a camera for acquiring, biometric information of the user.

17. The storage system of claim 15, wherein the host recognizes the storage device as a read-only device if the status bit is at a first logic level, and wherein the host recognizes the storage device as a read/write device if the status bit is at a second logic level.

18. The storage system of claim 15, wherein the memory controller provides the status information to the bridge board in response to the identification command, or provides the status information to the bridge board when the storage device is changed from the locked status to the unlocked status.

* * * * *